United States Patent
Duthie et al.

(10) Patent No.: US 12,392,238 B2
(45) Date of Patent: Aug. 19, 2025

(54) WELL TESTING METHOD USING TUBING HANGER DEPLOYED HEAT TRACER FLOW METERING SYSTEM

(71) Applicant: SAUDI ARABIAN OIL COMPANY, Dhahran (SA)

(72) Inventors: Laurie S. Duthie, Ras Tanura (SA); Mubarak Dhufairi, Manifa (SA); Abdulaziz A. Al-Anizi, Manifa (SA); Hussain A. Saiood, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 434 days.

(21) Appl. No.: 18/148,034

(22) Filed: Dec. 29, 2022

(65) Prior Publication Data

US 2024/0218785 A1 Jul. 4, 2024

(51) Int. Cl.
*E21B 47/10* (2012.01)
*E21B 33/04* (2006.01)
(Continued)

(52) U.S. Cl.
CPC .............. *E21B 47/10* (2013.01); *E21B 33/04* (2013.01); *E21B 33/127* (2013.01); *E21B 34/06* (2013.01);
(Continued)

(58) Field of Classification Search
CPC ........ E21B 47/10; E21B 33/04; E21B 33/127; E21B 34/06; E21B 47/06; E21B 47/07; G01F 1/10; G01F 1/7044; G01F 25/10
See application file for complete search history.

(56) References Cited

U.S. PATENT DOCUMENTS

| 2,962,895 A | 12/1960 | Rumble |
| 3,193,005 A | 7/1965 | Hunter et al. |

(Continued)

FOREIGN PATENT DOCUMENTS

| CA | 1041007 A | 10/1978 |
| CA | 3150064 A1 | 3/2021 |

(Continued)

OTHER PUBLICATIONS

Final Office Action issued in corresponding U.S. Appl. No. 18/059,931, dated Jan. 23, 2025 (14 pages).
(Continued)

*Primary Examiner* — Brad Harcourt
(74) *Attorney, Agent, or Firm* — Osha Bergman Watanabe & Burton LLP

(57) ABSTRACT

A method includes shutting in a well and connecting a pressure control system and a tool body to an adapted tubing hanger plug. The pressure control system, tool body, and adapted tubing hanger plug are installed into a borehole, which is then opened for fluid flow. A flow rate of the fluid flow is measured with a spinner. Temperature spikes are generated using a thermal generator, and a time for the temperature spikes to travel from the thermal generator to a temperature probe is measured. A flow rate of the fluid flow is calculated based on the time. Further, physical properties of the fluid flow are measured with sensors disposed within an electronics section of the tool body. Surface and subsurface safety valves are closed, and the adapted tubing hanger plug and the tool body are retrieved from the borehole. Data is downloaded for analysis.

20 Claims, 5 Drawing Sheets

(51) Int. Cl.
*E21B 33/127* (2006.01)
*E21B 34/06* (2006.01)
*E21B 47/06* (2012.01)
*E21B 47/07* (2012.01)
*G01F 1/10* (2006.01)
*G01F 1/704* (2006.01)

(52) U.S. Cl.
CPC ............... *E21B 47/06* (2013.01); *E21B 47/07* (2020.05); *G01F 1/10* (2013.01); *G01F 1/7044* (2013.01)

(56) References Cited

U.S. PATENT DOCUMENTS

| | | | |
|---|---|---|---|
| 5,226,333 A * | 7/1993 | Hess | G01P 13/04 |
| | | | 166/241.5 |
| 5,284,208 A | 2/1994 | Clemens et al. | |
| 6,920,395 B2 | 7/2005 | Brown | |
| 8,539,976 B1 | 9/2013 | Rodgers et al. | |
| 10,494,921 B2 | 12/2019 | Weng et al. | |
| 2002/0011336 A1* | 1/2002 | Baskett | E21B 33/0353 |
| | | | 166/88.4 |
| 2004/0006429 A1 | 1/2004 | Brown | |
| 2007/0044960 A1 | 3/2007 | Lovell et al. | |
| 2008/0083533 A1 | 4/2008 | Malone et al. | |
| 2011/0100112 A1 | 5/2011 | Du | |
| 2011/0198087 A1 | 8/2011 | Adam | |
| 2015/0240628 A1 | 8/2015 | Purkis | |
| 2016/0265341 A1 | 9/2016 | Subervie et al. | |
| 2021/0293140 A1 | 9/2021 | Brown et al. | |
| 2022/0282618 A1* | 9/2022 | Al-Huwaider | G01N 27/06 |

FOREIGN PATENT DOCUMENTS

| | | |
|---|---|---|
| CN | 1079488 A | 12/1993 |
| CN | 101358525 A | 2/2009 |
| CN | 102797454 A | 11/2012 |
| CN | 205558885 U | 9/2016 |
| CN | 205622279 U | 10/2016 |
| CN | 207623000 U | 7/2018 |
| CN | 108361025 A | 8/2018 |
| CN | 207715140 U | 8/2018 |
| CN | 110056325 A | 7/2019 |
| CN | 111379538 A | 7/2020 |
| CN | 213116281 U | 5/2021 |

OTHER PUBLICATIONS

"Tubing Hanger," Nov. 28, 2022; pp. 1-2; Retrieved from the Internet: URL: http://www.ccscpetro.com/tubing_hanger.html (2 pages).

* cited by examiner

WELL TESTING METHOD USING TUBING HANGER DEPLOYED HEAT TRACER FLOW METERING SYSTEM

BACKGROUND

Production monitoring is an essential component of any strategy to manage an oil and gas field. Well testing is necessary to assess the potential of the reservoir under dynamic conditions and is a key part of the production monitoring.

Conducting surface well testing requires a large amount of equipment, available space, and a large crew to operate the equipment. For some reservoir conditions, such as tight emulsions of water and oil, extra equipment and chemicals are required to break the emulsion, thus requiring the equivalent to a small production plant. Due to the cost inefficiencies of the traditional approach, an alternative method for testing reservoir fluids that uses minimal equipment and manpower would be useful.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method. The method may include shutting in a well and connecting a pressure control system and a tool body to an adapted tubing hanger plug. The method may also include installing the pressure control system, tool body, and adapted tubing hanger plug into a borehole and opening the borehole for fluid flow. The method may further include measuring a first flow rate of the fluid flow with a spinner, generating one or more temperature spikes using a thermal generator, and measuring a time for the one or temperature spikes to travel from the thermal generator to a temperature probe. The method includes calculating a second flow rate of the fluid flow based, at least in part, on the time. Further, the method also includes measuring one or more physical properties of the fluid flow with one or more sensors disposed within an electronics section of the tool body, closing surface and subsurface safety valves, retrieving the adapted tubing hanger plug and the tool body from the borehole, and downloading data for analysis of the first and second flow rates and the one or more physical properties.

In another aspect, embodiments disclosed herein relate to a system. The system may include an adapted tubing hanger plug configured to allow flow of a fluid from a borehole to a surface location and a tool body extending from the adapted tubing hanger plug. A first set of flow ports may be positioned at a lower axial end of the tool body and may be configured to allow the fluid to flow into the tool body. A second set of flow ports may be positioned in a middle of the tool body and may be configured to allow the fluid to flow out of the tool body into an annulus formed between the tool body and a production tubing. A third set of flow ports may be positioned at an upper axial end of the tool body and may be configured to allow the fluid to flow out of the annulus and through the adapted tubing hanger plug to a production plant positioned at the surface location. The system may also include a thermal generator configured to produce one or more temperature spikes in the fluid, and a temperature probe positioned a distance from the thermal generator and configured to measure a time for the one or more temperature spikes to travel from the thermal generator to the temperature probe. The system may further include a hydraulic packer installed in the annulus, a hydraulic pump section configured to inflate and deflate the hydraulic packer, and an electronics section. The electronics section may include a first battery pack, a first programmable controller, a plurality of sensors configured to measure pressure data, temperature data, fluid density data, and fluid phase data, and a memory section configured to record the pressure data, the temperature data, the fluid density data, and the fluid phase data. The system may also include a spinner configured to measure flow rate of the fluid.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-5, any component described with regard to a figure, in various embodiments disclosed herein, may be equivalent to one or more like-named components described with regard to any other figure. For brevity, descriptions of these components may not be repeated for each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

In one aspect, embodiments disclosed herein relate to an adapted tubing hanger apparatus in accordance with one or more embodiments. More specifically, embodiments disclosed herein to a well testing system deployed in conjunction with an adapted tubing hanger apparatus. In another aspect, embodiments disclosed herein relate to a method for validating a fluid flow rate measurement within a tool body disposed in a production tubing. Further, embodiments disclosed herein relate to performing well testing procedures using a tool body connected to an adapted tubing hanger plug.

Figure 1:
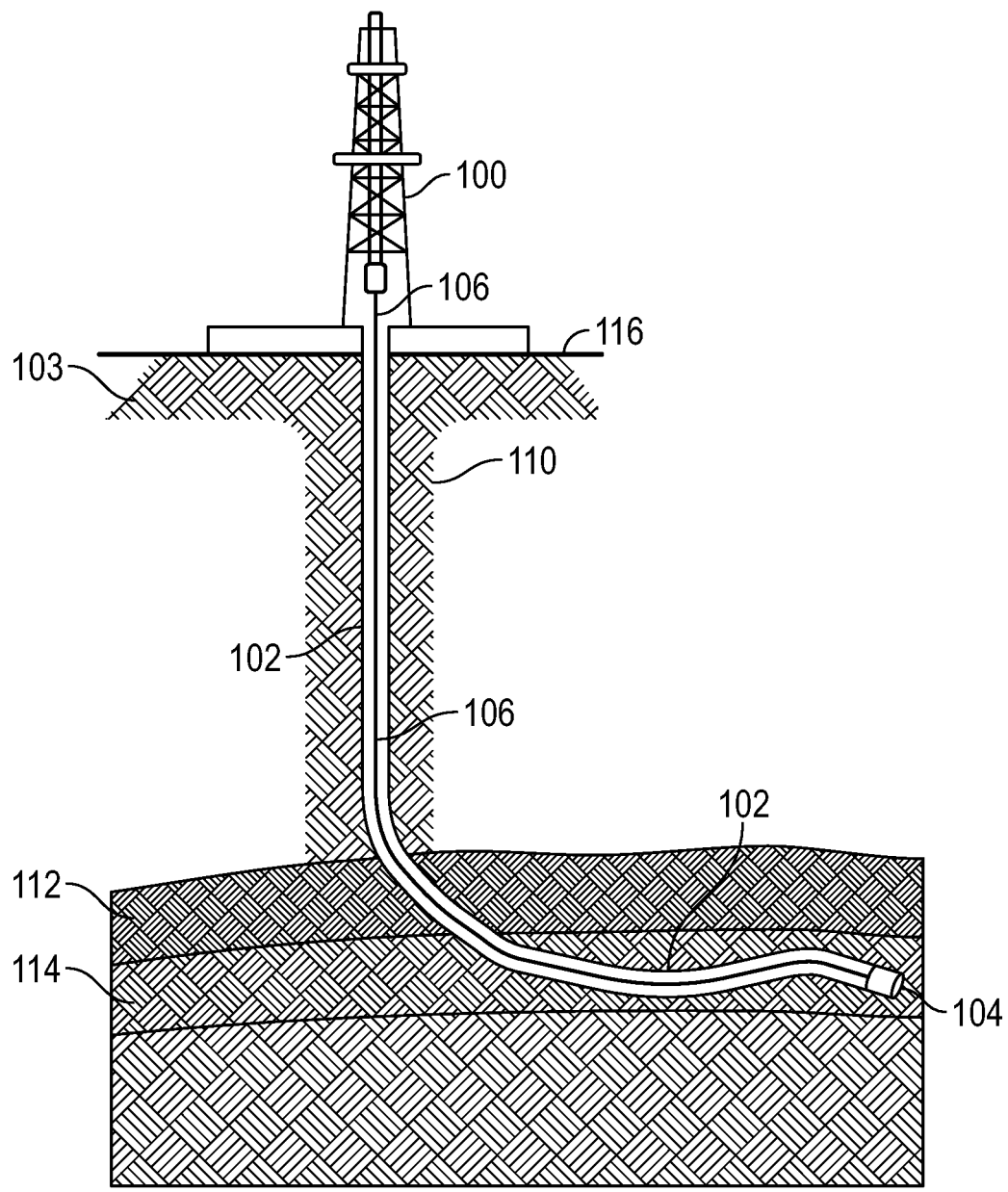
FIG. 1 shows a drilling system in accordance with one or more embodiments.

FIG. 1 illustrates a drilling system in accordance with one or more embodiments. Specifically, FIG. 1 shows a well (102) that may be drilled into the subsurface (103) by a drill bit (104) attached by a drillstring (106) to a drill rig (100) located on the Earth's surface (116). The borehole (108) corresponds to the uncased portion of the well (102). The borehole trajectory is the path in three-dimensional space that the well (102) is drilled through the subsurface (103). The borehole (108) of the well (102) may traverse a plurality of overburden layers (110) and one or more cap-rock layers (112) to a hydrocarbon reservoir (114). The curved well path of the drillstring (106) may be planned based, at least in part, on a seismic image or other remote sensing data.

Tool strings (126) contain sensors and are lowered into boreholes (108) in the oil and gas industry for a variety of reasons, including to perform well logging, remediation, etc. The tool string (126) is inserted and retrieved from the borehole (108) with a line. The sensors usually require power while in the borehole (108) to perform their functions. This power may come from a variety of sources (e.g., electrical, mechanical, battery, etc.). Wireline is an electrically conductive cable usually comprising helically twisted wires surrounding an insulated conductive core. Electrical power may be passed along wireline from the surface (116) to the sensor. The wireline may also be used for communication between the surface (116) and the sensor in the borehole (108). Alternatively, a winch at the surface (116) may generate mechanical power and transmit it down the borehole (108) through steel cables known as slicklines. However, slicklines are normally not configured to deliver electrical power. Therefore, when using slickline, power for sensors in the borehole (108) is usually provided by batteries. Coiled tubing, a continuous length of pipe wound on a spool, is widely used in place of slickline or wireline in the case of a highly deviated or horizontal well (102). The coiled tubing is forced through the borehole (108) to access the targeted interval.

Figure 2:
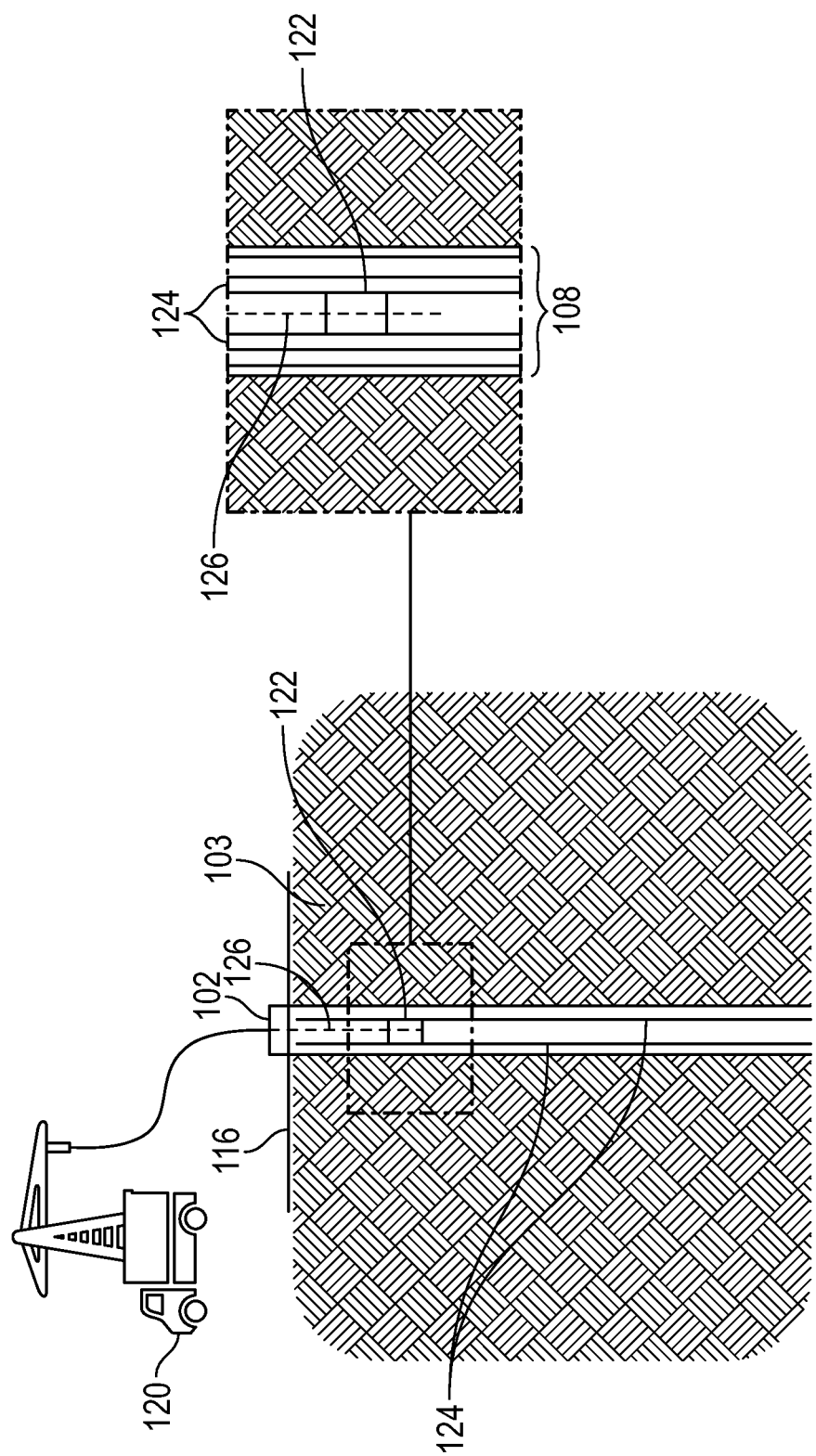
FIG. 2 shows a tubing hanger deployed apparatus with a plug in a borehole.

FIG. 2 illustrates systems in accordance with one or more embodiments. Specifically, FIG. 2 shows the top portion of the well (102) from FIG. 1 that has been drilled into the subsurface (103). Casing (124) is pipe that may be lowered into a borehole (108) and is designed to resist compressive and tensile stresses in the subsurface (103). A plug (122) is a device that isolates the well (102) to perform a pressure test. For the systems and method disclosed herein, the plug (122) may be installed near the surface (116) of the borehole (108), but is not limited to this location and may be disposed in any suitable location for plugging the well (102).

Once production of hydrocarbons has begun, the methods to evaluate fluid properties in a well (102) include sampling of fluids and gases, surface well tests and transient-pressure tests; these methods are used to determine rock properties and formation limits. Sampling of fluids & gases may be performed at the surface or subsurface. Further, these samples may be analyzed in a laboratory to determine the physical properties. Surface well tests may be achieved by using surface located equipment such as 3-phase separators or multi-phase flowmeters to measure the surface oil, gas and water rates. A pressure gauge lowered into the borehole (108) may be used to measure bottom hole flowing and shut in pressures. Transient pressure tests assess the pressure in the borehole (108) near the productive interval after the flow rate of the well (102) is changed. In general, the most effective method is when the flow rate is zero, which occurs when the well is shut in. A pressure build-up test measures the bottomhole pressure data acquired after a producing well (102) is shut in and are the preferred means to determine well flow capacity, permeability thickness, skin effect, and other information.

Figure 3:
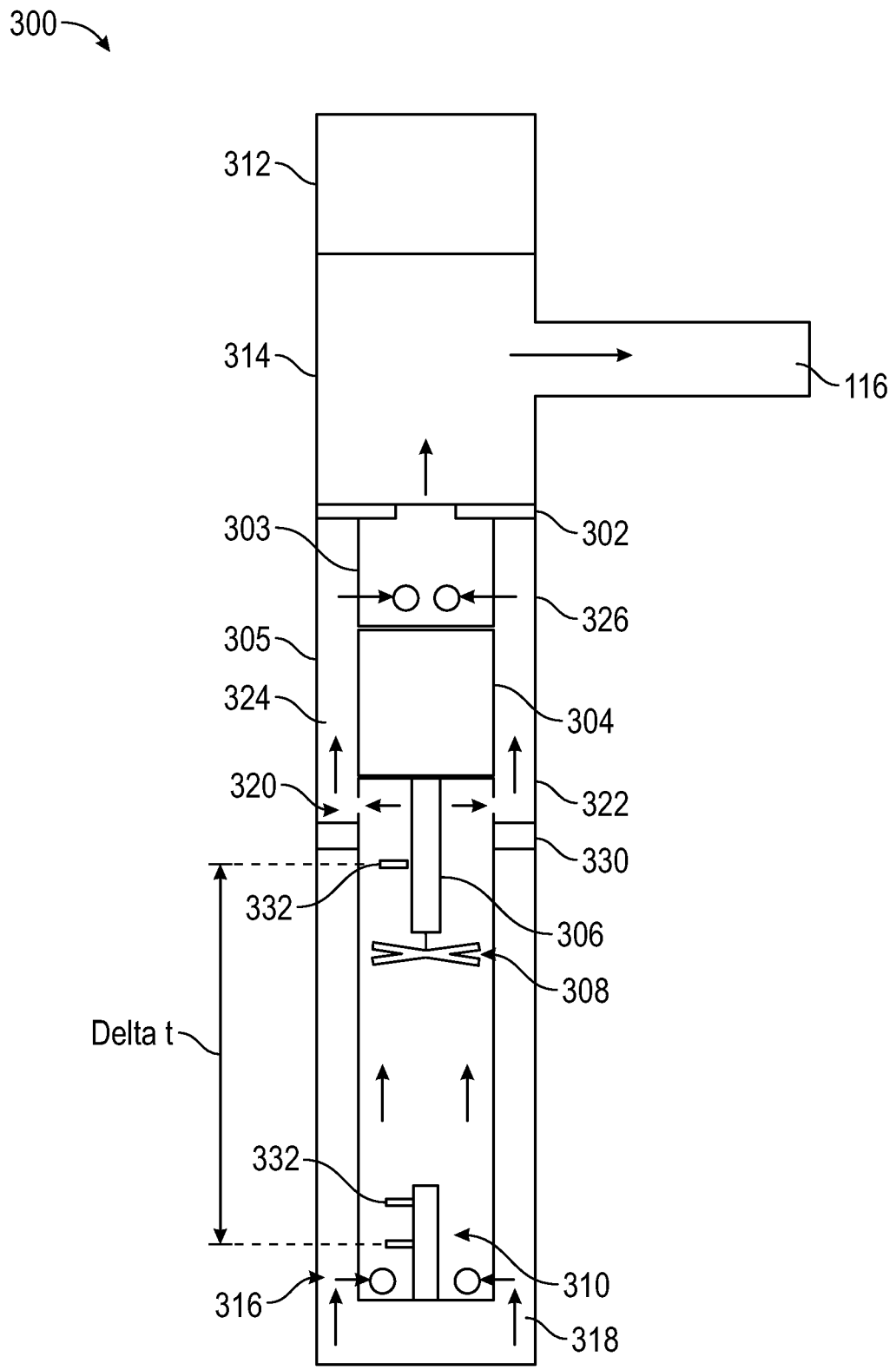
FIG. 3 shows a tubing hanger deployed apparatus in accordance with one or more embodiments.

The method and systems presented herein offer an alternative to the traditional methods of well testing and require no wireline or coiled tubing units. Specifically, in one or more embodiments, FIG. 3 shows the layout of a tubing hanger deployed apparatus (300). The apparatus's main components are an adapted tubing hanger plug (302), a hydraulic pump section (304), an electronics section (306), a spinner (308) and a thermal generator section (310). Each of these components of the tubing hanger deployed apparatus (300) is discussed in detail below.

An adapted valve is used to hang a tool string (126) in the borehole (108). The tool string (126) is lowered through the pressure control system (312) on a rod and screwed into the production tubing hanger profile. The production tubing hanger profile is a suite of equipment typically installed near the wellhead that is used to support a tubing string lowered into a borehole. A truck-mounted crane (120) may be used to hang the tool string (126). This system provides an advantage in terms of ease of deployment, reduced onsite footprint, requires less personnel to operate the equipment, and has a lower overall cost. A pressure control system (312) prevents the uncontrolled flow of liquids and gases from a borehole (108) to a production tree (314) during well (102) drilling or production operations.

There are many situations where this type of measurement will provide a more accurate rate measurement than other conventional methods. For instance, when measuring flow rates in a deviated or horizontal borehole (108) the phases may naturally segregate, with the heavier phase on the lower side and lighter phases on the upper side of the borehole (108). This makes it more difficult to accurately assess the flow rate. A fullbore spinner (308) may be used to measure the flow rate. More specifically, a pick-up may measure each rotation made using the mechanical energy of the fluid to rotate the blades of the spinner (308). The rotation measurements may be used to calculate a proportionate measurement relative to the flow rate. Since the spinner (308) as used in this invention is located near the surface (116), it will be in a vertical position and the phases will be naturally mixed during turbulent flow, thus avoiding the problem.

Another example is where the gas/oil ratio is low and tight emulsions are present that cannot be separated using a standard surface well testing package. In this case, it is difficult to separate and measure the low gas content, as well as separate the oil and water phases from the tight emulsion and can lead to erroneous rate measurements. The deployment of a spinner (308) inside the well (102) again will more accurately measure the flow rates and water cut because it does not require the phases to be separated.

If the fluids are in a single-phase condition or a bi-phase condition (with pressure above the bubble point), this method will perform even more accurately. The single-phase condition may be oil or water, while the bi-phase condition may be a combination of water and oil. All results of using the installed spinner (308) can be confirmed through surface fluid sampling.

Calibration of the spinner (308) is done outside the borehole (108) prior to use. The spinner (308) is run in combination with other sensors to measure pressure, temperature, fluid type, and fluid density and thereby determine the water cut. Tubing hangers can have a profile which can be used to set plugs (122), to isolate the well (102), or to pressure test the production tree (314). This profile can also be used to set the complete toolstring. This is done using the pressure control system (312) atop the production tree (314) along with mechanical tools to set the plug (122); in this case, no wireline is used. A standard plug (122) is adapted to allow full flow through it and set in the tubing hanger with the tool string (126) attached below.

The adapted tubing hanger plug (302) is a standard plug (122) for tubing hanger applications that has been adapted to allow for full flow through it. The adapted tubing hanger plug (302) has a centralized through-hole to allow full flow with a perforated joint (216) connected below the adapted tubing hanger plug and above the tool string (126).

A tool body (303) may house the components below the adapted tubing hanger plug (302). In one or more embodiments, the tool body (303) may be a steel housing. In one or more embodiments, the sizing of the tool body (303) may be adjusted to fit the completion tubing (305). For example, if the completion tubing (305) has a diameter of 4.5", the tool body (303) may have a diameter of 2.5" and the one or more components held within the tool body (303), such as the electronics section (306) and the thermal generator section (310), may have a diameter of 1".

In one or more embodiments, a number of flow ports may be integrally formed into the tool body (303). A first set of flow ports (316) may allow fluid flow to enter the tool body (303) at a lower axial end (318). In one or more embodiments, fluid may flow through the first set of flow ports (316) and past the thermal generator section (310), the spinner (308), and the electronics section (306).

A second set of flow ports (320) may be positioned at a middle (322) of the tool body (303). In one or more embodiments, the second set of flow ports (320) may be configured to allow the fluid to flow out of the tool body (303) into an annulus (324) formed between the tool body (303) and a production or completion tubing (305).

A third set of flow ports (326) may be positioned at an upper axial end (328) of the tool body (303). In one or more embodiments, the third set of flow ports (326) may be configured to allow fluid to flow out of the annulus (324) and through the adapted tubing hanger plug (302) to a production plant positioned at the surface (116).

A hydraulic pump section (304) may be positioned between the adapted tubing hanger plug (302) and the electronics section (306). In one or more embodiments, the hydraulic pump section (304) may also be positioned between the second and third sets of flow ports (320, 326). The hydraulic pump section (304) may be configured to inflate and deflate a hydraulic packer (330), which may be positioned in the annulus (324). The hydraulic packer (330) may be configured to provide a seal between the tool body (303) and the production or completion tubing (305), and to divert flow completely through annulus (324) and to the adapted tubing hanger plug (302).

In one or more embodiments, the hydraulic pump section (304) may include a hydraulic pump and a battery pack configured to power the hydraulic pump. In other embodiments, the hydraulic pump may be powered from the surface with an electrical cable connecting the hydraulic pump section (304) to surface control equipment. A stainless tubing may connect the hydraulic pump to the hydraulic packer (330). The hydraulic pump section (304) may also include a reservoir filled with a volume of hydraulic fluid, where the volume of hydraulic fluid is sufficient to inflate the hydraulic packer (330). The hydraulic pump section (304) may also include a programmable controller which may operate the hydraulic pump section (304) according to a preprogrammed memory mode or according to surface control. In one or more embodiments, surface control of the hydraulic pump section (304) may be achieved through a wired or wireless connection.

The electronics section (306) may include a battery pack and a programmable controller. In one or more embodiments, the programmable controller may be pre-programmed in a memory mode or may be activated by either wired or wireless surface control. In one or more embodiments, the programmable controller may serve as the primary control mechanism for a number of sensors installed in the electronics section (306). For example, the programmable controller may dictate sampling frequency and duration for each sensor. In one or more embodiments, the installed sensors may measure pressure, temperature, fluid density, and fluid phase. In one or more embodiments, one of the sensors may be a temperature probe (332) configured to detect one or more temperature spikes generated by the thermal generator section (310). The programmable controller may also have a memory section configured to record and store data collected by each of the sensors. In some embodiments, a data and/or power cable may connect the electronics section (306) to a surface control module, where the data and/or power cable is configured to transmit data in real time. In other embodiments, data may be wirelessly transmitted to the surface (116) since the equipment is positioned relatively close to the surface (116).

In one or more embodiments, the thermal generator section (310) may refer to a high energy temperature element which may be powered a battery. The thermal generator section (310) may be configured to provide a burst of energy, creating temperature spikes which may be detected by the temperature probe (332) installed in the electronics section (306). In one or more embodiments, the time required for each temperature spike to travel from the thermal generator section (310) to the temperature probe (332), i.e., the delta t (334), may be measured. Given that a fixed distance separates the thermal generator section (310) and the temperature probe (332), fluid velocity may be calculated. Once fluid velocity is known, a volumetric flow rate may then be calculated, and a correction factor may be applied.

Alternatively, fluid velocity may be measured using the relationship between dissipated power and the temperature difference before and after heating. The functional relationship between these variables may be obtained by performing a calibration in a laboratory flow loop using fluids with the same or similar thermophysical properties. In one or more embodiments, the resultant calibration data file may contain values of fluid velocity as a function of dissipated power and fluid temperature.

In one or more embodiments, the thermal generator section (310) and the temperature probe (332) may be positioned around an axial center of the tool body (303). Further, the thermal generator section (310) may be configured to generate a number of temperature spikes, such that a number of volumetric flow rates may be calculated, allowing for observations of flow rate consistency or inconsistency. In one or more embodiments, the thermal generator section (310) may be designed for use in either a single phase or a liquid phase with a gas in the solution. The thermal generator section (310) may be calibrated in a lab prior to installation in the tool body (303).

Figure 4:
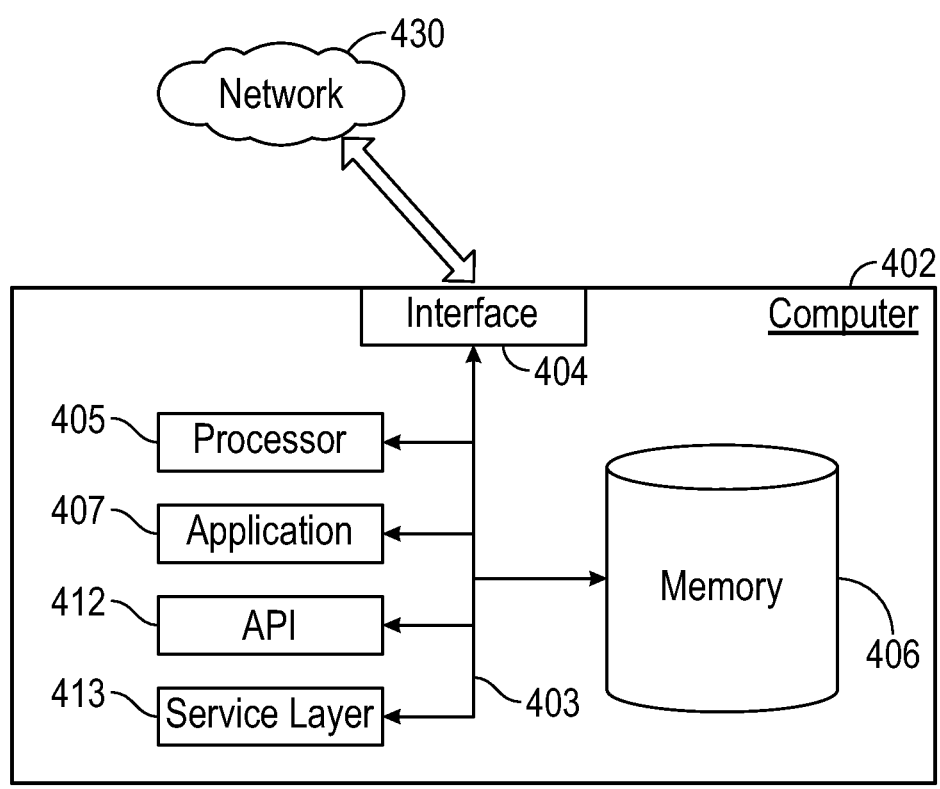
FIG. 4 shows a computer system in accordance with one or more embodiments.

FIG. 4 depicts a block diagram of a computer system (402) used to provide computational functionalities associated with described algorithms, methods, functions, processes, flows, and procedures as described in this disclosure, according to one or more embodiments. In particular, the computer system (402) as used herein provides computation functionality for operating a surface (116) pressure control system (312), a spinner (308), a hydraulic pump section (304), and an electronics section (306), including attached sensors, and a thermal generator section (310). The computer system may also be used to process, analyze, and display the measurement data from the sensors that measure the fluid flow in the wellbore.

The illustrated computer (402) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (402) may include a computer that includes an input device, such as a keypad, keyboard, touch screen, or other device that can accept user information, and an output device that conveys information associated with the operation of the computer (402), including digital data, visual, or audio information (or a combination of information), or a GUI.

The computer (402) can serve in a role as a client, network component, a server, a database or other persistency, or any other component (or a combination of roles) of a computer system for performing the subject matter described in the instant disclosure. The illustrated computer (402) is communicably coupled with a network (430). In some implementations, one or more components of the computer (402) may be configured to operate within environments, including cloud-computing-based, local, global, or other environment (or a combination of environments).

At a high level, the computer (402) is an electronic computing device operable to receive, transmit, process, store, or manage data and information associated with the described subject matter. According to some implementations, the computer (402) may also include or be communicably coupled with an application server, e-mail server, web server, caching server, streaming data server, business intelligence (BI) server, or other server (or a combination of servers).

The computer (402) can receive requests over network (430) from a client application (for example, executing on another computer (402) and responding to the received requests by processing the said requests in an appropriate software application. In addition, requests may also be sent to the computer (402) from internal users (for example, from a command console or by other appropriate access method), external or third-parties, other automated applications, as well as any other appropriate entities, individuals, systems, or computers.

Each of the components of the computer (402) can communicate using a system bus (403). In some implementations, any or all of the components of the computer (402), both hardware or software (or a combination of hardware and software), may interface with each other or the interface (404) (or a combination of both) over the system bus (403) using an application programming interface (API) (412) or a service layer (413) (or a combination of the API (412) and service layer (413). The API (412) may include specifications for routines, data structures, and object classes. The API (412) may be either computer-language independent or dependent and refer to a complete interface, a single function, or even a set of APIs. The service layer (413) provides software services to the computer (402) or other components (whether or not illustrated) that are communicably coupled to the computer (402). The functionality of the computer (402) may be accessible for all service consumers using this service layer. Software services, such as those provided by the service layer (413), provide reusable, defined business functionalities through a defined interface. For example, the interface may be software written in JAVA, C++, or other suitable language providing data in extensible markup language (XML) format or another suitable format. While illustrated as an integrated component of the computer (402), alternative implementations may illustrate the API (412) or the service layer (413) as stand-alone components in relation to other components of the computer (402) or other components (whether or not illustrated) that are communicably coupled to the computer (402). Moreover, any or all parts of the API (412) or the service layer (413) may be implemented as child or sub-modules of another software module, enterprise application, or hardware module without departing from the scope of this disclosure.

The computer (402) includes an interface (404). Although illustrated as a single interface (404) in FIG. 4, two or more interfaces (404) may be used according to particular needs, desires, or particular implementations of the computer (402). The interface (404) is used by the computer (402) for communicating with other systems in a distributed environment that are connected to the network (430). Generally, the interface (404) includes logic encoded in software or hardware (or a combination of software and hardware) and operable to communicate with the network (430). More specifically, the interface (404) may include software supporting one or more communication protocols associated with communications such that the network (430) or interface's hardware is operable to communicate physical signals within and outside of the illustrated computer (402).

The computer (402) includes at least one computer processor (405). Although illustrated as a single computer processor (405) in FIG. 4, two or more processors may be used according to particular needs, desires, or particular implementations of the computer (402). Generally, the computer processor (405) executes instructions and manipulates data to perform the operations of the computer (402) and any algorithms, methods, functions, processes, flows, and procedures as described in the instant disclosure.

The computer (402) also includes a memory (406) that holds data for the computer (402) or other components (or a combination of both) that can be connected to the network (430). For example, memory (406) can be a database storing data consistent with this disclosure. Although illustrated as a single memory (406) in FIG. 4, two or more memories may be used according to particular needs, desires, or particular implementations of the computer (402) and the described functionality. While memory (406) is illustrated as an integral component of the computer (402), in alternative implementations, memory (406) can be external to the computer (402).

The application (407) is an algorithmic software engine providing functionality according to particular needs, desires, or particular implementations of the computer (402), particularly with respect to functionality described in this disclosure. For example, application (407) can serve as one or more components, modules, applications, etc. Further, although illustrated as a single application (407), the application (407) may be implemented as multiple applications (407) on the computer (402). In addition, although illustrated as integral to the computer (402), in alternative implementations, the application (407) can be external to the computer (402).

There may be any number of computers (402) associated with, or external to, a computer system containing computer (402), wherein each computer (402) communicates over network (430). Further, the term "client," "user," and other appropriate terminology may be used interchangeably as appropriate without departing from the scope of this disclosure. Moreover, this disclosure contemplates that many users may use one computer (402), or that one user may use multiple computers (402).

Figure 5:
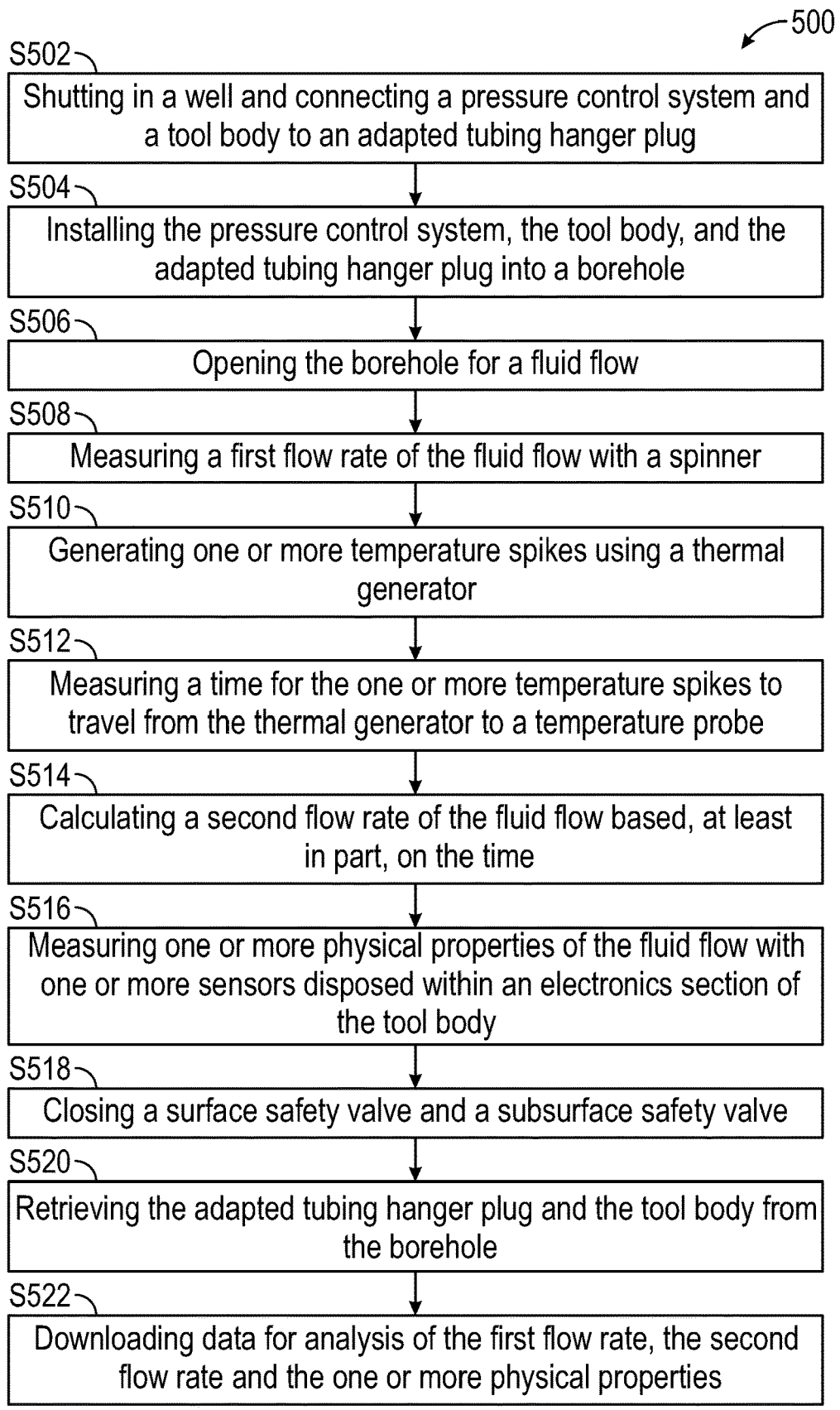
FIG. 5 shows a flowchart of a method in accordance with one or more embodiments.

FIG. 5 shows a flowchart for a method of logging while levitating in accordance with one or more embodiments. More specifically, FIG. 5 depicts a flowchart (500) of a method for installing and operating a well testing system in accordance with one or more embodiments. FIG. 5 may apply to both tethered and untethered conveyance methods. Further, one or more blocks in FIG. 5 may be performed by one or more components as described in FIGS. 1-4. While the various blocks in FIG. 5 are presented and described sequentially, one of ordinary skill in the art will appreciate that some or all of the blocks may be executed in different orders, may be combined, may be omitted, and some or all of the blocks may be executed in parallel. Furthermore, the blocks may be performed actively or passively.

Initially, a well (102) may be shut in and a pressure control system (312) and a tool body (303) may be connected to an adapted tubing hanger plug (302), S502. In one or more embodiments, the tool body (303) may extend from the adapted tubing hanger plug (302) into the borehole (108). Depending on desired test duration, the surface pressure control system (312) may remain rigged up throughout the test, or it may be rigged down. The pressure control system (312), tool body (303), and the adapted tubing hanger plug (302) may be installed into a borehole (108), which may be cased with a production or completion tubing (305), S504. In one or more embodiments, a winch may be positioned at the surface (116) and may be configured to generate and transmit mechanical power to the tool body (303) through a slick line.

In one or more embodiments, the adapted tubing hanger plug (302) and the tool body (303) may be run into the completion tubing (305) and the surface pressure control equipment (312) may be installed so as to prevent the uncontrolled flow of liquids and gases from the borehole (108) to the production tree (314). Following installation, the borehole (108) may be opened for fluid flow, S506. In one or more embodiments, an operator must wait for the fluid flow rate to stabilize prior to beginning any testing procedure.

Once stabilization of fluid flow is achieved, a first flow rate of the fluid flow may be measured with a spinner (308), S508. The thermal generator section (310) may generate one or more temperature spikes in the fluid as it flows over the thermal generator section (310) and up the tool body (303) towards the electronics section (306), S510. The time for the one or more temperatures spikes to travel between the thermal generator section (310) to the thermal probe (332) may be measured, S512. In one or more embodiments, steps S508-S512 may be performed simultaneously. Further, the spinner (308) may operate continuously.

A second flow rate of the fluid flow may be calculated based, at least in part, on the measured time, S514. Given that a fixed distance separates the thermal generator section (310) and the temperature probe (332), fluid velocity may be calculated. Once fluid velocity is known, a volumetric flow rate may then be calculated, and a correction factor may be applied. Alternatively, fluid velocity may be measured using the relationship between dissipated power and the temperature difference before and after heating.

One or more physical properties of the fluid flow may be measured with one or more sensors disposed in the electronics section (306) of the tool body (303), S516. In one or more embodiments, the installed sensors may measure pressure, temperature, fluid density, and fluid phase.

A surface and a subsurface safety valve may be closed, S518. The tool body (303) and the adapted tubing hanger plug (302) may be retrieved from the borehole (108), S520. Further, data from the sensors may be downloaded to allow for analysis of the first flow rate, the second flow rate, and the one or more physical properties, S522.

Embodiments of the present disclosure may provide at least one of the following advantages. Production monitoring is a key component of effectively managing any oil and gas production strategies. Well testing to capture production rates is an integral part of production monitoring. Measuring fluid volumetric flow rate with a spinner and then verifying this flow rate via the use of the thermal generator section and the thermal probe allows for increased reliability and accuracy in determining production rates.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:
shutting in a well and connecting a pressure control system and a tool body to an adapted tubing hanger plug;
installing the pressure control system, the tool body, and the adapted tubing hanger plug into a borehole;
opening the borehole for a fluid flow;
measuring a first flow rate of the fluid flow with a spinner;
generating one or more temperature spikes using a thermal generator;
measuring a time for the one or more temperature spikes to travel from the thermal generator to a temperature probe;
calculating a second flow rate of the fluid flow based, at least in part, on the time;

measuring one or more physical properties of the fluid flow with one or more sensors disposed within an electronics section of the tool body;

closing a surface safety valve and a subsurface safety valve;

retrieving the adapted tubing hanger plug and the tool body from the borehole; and downloading data for analysis of the first flow rate, the second flow rate, and the one or more physical properties.

2. The method of claim 1, further comprising using the second flow rate to verify the first flow rate.

3. The method of claim 1, wherein the one or more physical properties are selected from a group consisting of pressure, temperature, density, and fluid phase.

4. The method of claim 1, further comprising calibrating the spinner.

5. The method of claim 1, further comprising pre-programming a controller within the electronics section, wherein the controller is configured to operate the one or more sensors.

6. The method of claim 1, further comprising activating a controller within the electronics section with a surface control module, wherein the controller is configured to operate the one or more sensors.

7. The method of claim 6, further comprising activating the controller via a wireless connection between the controller and the surface control module.

8. The method of claim 6, further comprising activating the controller via a wired connection between the controller and the surface control module.

9. The method of claim 1, further comprising using a hydraulic pump section of the tool body to inflate and deflate a hydraulic packer installed in an annulus formed between the tool body and a production tubing.

10. A system, comprising:
an adapted tubing hanger plug configured to allow flow of a fluid from a borehole to a surface location;
a tool body extending from the adapted tubing hanger plug;
a first set of flow ports positioned at a lower axial end of the tool body and configured to allow the fluid to flow into the tool body;
a second set of flow ports positioned in a middle of the tool body and configured to allow the fluid to flow out of the tool body into an annulus formed between the tool body and a production tubing;
a third set of flow ports positioned at an upper axial end of the tool body and configured to allow the fluid to flow out of the annulus and through the adapted tubing hanger plug to a production plant positioned at the surface location;
a thermal generator configured to produce one or more temperature spikes in the fluid;
a temperature probe positioned a distance from the thermal generator and configured to measure a time for the one or more temperature spikes to travel from the thermal generator to the temperature probe;
a hydraulic packer installed in the annulus;
a hydraulic pump section configured to inflate and deflate the hydraulic packer;
an electronics section, comprising:
a first battery pack;
a first programmable controller;
a plurality of sensors configured to measure pressure data, temperature data, fluid density data, and fluid phase data; and
a memory section configured to record the pressure data, the temperature data, the fluid density data, and the fluid phase data; and
a spinner configured to measure flow rate of the fluid.

11. The system of claim 10, further comprising a pressure control system configured to prevent an uncontrolled flow of the fluid from the borehole.

12. The system of claim 10, wherein the plurality of sensors comprises a pressure sensor, a temperature sensor, a density sensor, and a fluid phase sensor.

13. The system of claim 10, further comprising a wireless communication system connecting the surface location and the first programmable controller.

14. The system of claim 10, further comprising a wired communication system connecting the surface location and the first programmable controller.

15. The system of claim 10, wherein the hydraulic pump section comprises:
a hydraulic pump;
a second battery pack configured to power the hydraulic pump;
a stainless tubing connecting the hydraulic pump to the hydraulic packer;
a reservoir filled with a volume of hydraulic fluid; and
a second programmable controller.

16. The system of claim 10, wherein the spinner is calibrated at the surface location.

17. The system of claim 10, wherein the adapted tubing hanger plug is a standard plug adapted to allow a fluid flow through the standard plug.

18. The system of claim 10, wherein the adapted tubing hanger plug has a centralized hole to allow a fluid flow with a perforated joint connected below the adapted tubing hanger plug and above the tool body.

19. The system of claim 10, further comprising a lifting mechanism positioned at the surface location and configured to generate and transmit mechanical power to lift the tool body and a pressure control system for installation on a production tree.

20. The system of claim 10, wherein the hydraulic packer is configured to provide a seal between the tool body and the production tubing.

* * * * *